Sept. 24, 1940.   H. H. SCHOOLER   2,215,516
POTATO DIGGER
Filed Nov. 14, 1938   3 Sheets-Sheet 2

HARRY H. SCHOOLER, Inventor

Attorney

Sept. 24, 1940.                H. H. SCHOOLER                2,215,516
                                POTATO DIGGER
Filed Nov. 14, 1938                              3 Sheets-Sheet 3

HARRY H. SCHOOLER
Inventor

Herbert E. Brietts
Attorney

Patented Sept. 24, 1940

2,215,516

UNITED STATES PATENT OFFICE 2,215,516

POTATO DIGGER

Harry H. Schooler, Genesee, Idaho

Application November 14, 1938, Serial No. 240,217

15 Claims. (Cl. 55—51)

My present invention relates to an improved potato digger of the tractor-propelled type, which is provided with a plurality of units each of which includes a shovel-type plow, an endless elevator or carrier, and an endless draper or slatted endless conveyer, together with means for sacking the potatoes of the uprooted crop. In the accompanying exemplification of the invention I employ two units, one unit mounted at each side of the tractor, with the plow section of each unit supported in a wheeled frame in front of the tractor. The rear, or delivery ends of the laterally spaced units are also mounted on a wheeled frame or platform at the rear of the tractor, and the sacking appliances are also mounted or located at the rear ends of the endless conveyers over the rear platform.

A single power-operated control mechanism is provided at the front of the front frame for lifting and vertically adjusting both of the digging units or plows, simultaneously, and with facility, in order that the tractor-propelled implement may be maneuvered readily in the field, and the plow-units may conveniently be lifted to inoperative position for transporting the implement to or from a field.

Due to the compact and convenient arrangement of the various parts of the implement the latter is adapted to travel with the two endless traction belts of the tractor moving along parallel furrows in the field, and the two laterally disposed plowing units are adapted to travel in alinement with two parallel hills or rows for uprooting the potatoes from the field, thus providing an implement of unusually high capacity for work.

It is a prime object of my invention to provide a tractor-powered digger which can be operated along one or more rows of potatoes, and permitting the digging operation to be under the direct observation of the operator and be controlled to compensate for variations in the rows, due to uneven planting.

Another object of the invention is to provide a power digger which accomplishes the digging operation in advance of the power or traction means, whereby the possibility of mechanical damage to the potatoes may be eliminated.

A further object of the invention has been the provision of a compact unit for the support of the machinery which can be readily attached to or detached from the tractor unit.

A still further object of my invention has been the provision of a potato digger which, when attached to the power unit, compactly arranges the various digging, conveying, and sacking means in a manner so that each step of the operation is under immediate observation and control of the operator of the tractor unit.

A further object of my invention has been to provide a structure for supporting potato digging and sacking means whereby said means may be of the conventional type and readily adapted to my pusher-propelled supporting frame.

Another and further object of my invention is to provide a tractor-powered digger which, being supported in advance of the tractor unit, will raise and lower in direct relation to the contour of the ground over which the implement is passing, thereby insuring a uniformity in the depth to which the digger plow penetrates.

A further object of my invention is to provide a power-operated digger which is of simple construction and results in low cost of manufacture.

The invention consists in certain novel combinations and arrangements in this type of multiplow implement as will hereinafter be more fully pointed out and claimed. In the accompanying drawings I have illustrated a dual or duplex plowing implement in which the parts are combined and arranged in accord with one mode I have thus far devised for the practical application of the principles of my invention, but it will be understood that changes and alterations may be made and are contemplated in these exemplifications, within the scope of my appended claims without departing from the principles of the invention.

Figure 6 is a detail view illustrating the manner in which the elevating trough is connected slidably and pivotally to the upright frame standards.

Figure 1:
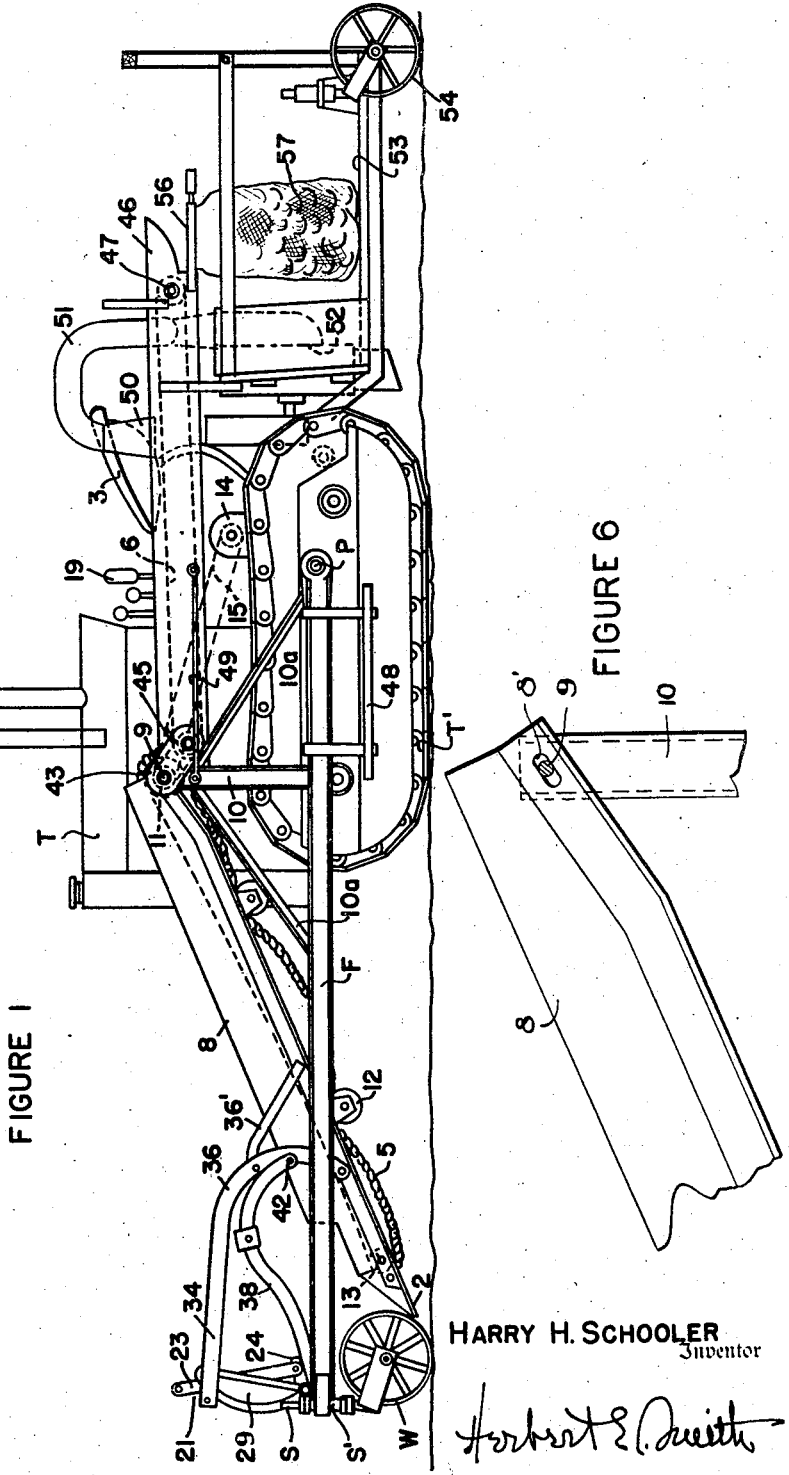
Figure 1 is a side elevation of an implement embodying my invention, showing the plows uplifted.
Figure 2:
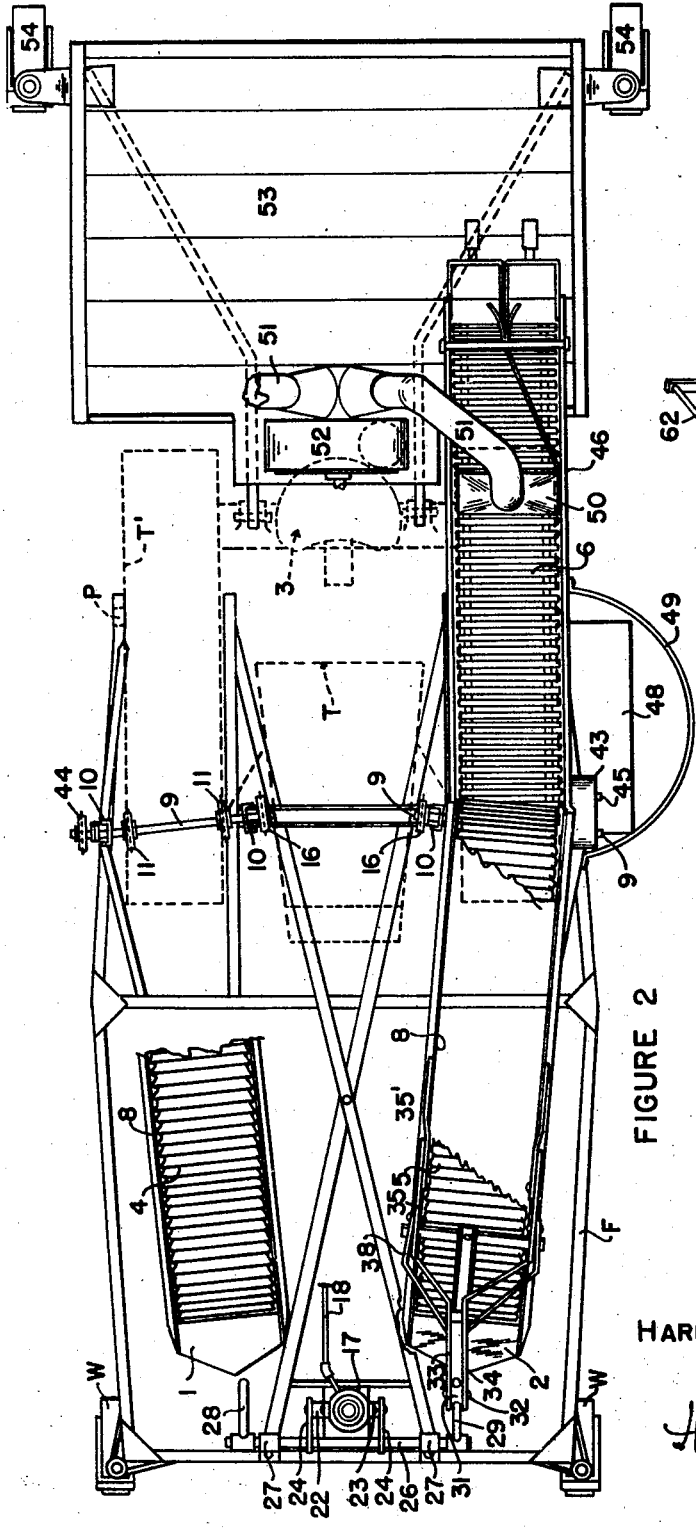
Figure 2 is a top plan view of the implement of Figure 1, some duplicate parts being omitted for convenience of illustration, and the tractor being shown by dotted lines.

In order that the purpose and utility of the implement may readily be understood I have indicated in Figures 1 and 2 a conventional tractor T with the usual laterally spaced endless traction belts T' and it will be understood that the furrows in the potato field are spaced to accommodate these endless tracks or belts T'. A horizontal main frame, for the plows, indicated by the letter F, is pivoted at P on a suitable supporting part of the tractor, and this main frame, which is of general U-shape and braced, projects in front of the tractor with its front end supported by the caster wheels W. The pivoted frame F may be raised or lowered on its pivotal supports P, with relation to the ground wheels or casters W, by means of the spindles S that are enclosed within the sleeves S' of the wheel mounts and set bolts B are employed for holding the frame in adjusted position. Usually the frame F is adjusted to horizontal position as indicated in Figure 1.

The two laterally spaced plow units are located within the frame F, and these units are jointly supported by the front or cross car of the frame F and the tractor T. The plow units are arranged at opposite sides of the tractor so that the plows or shovels 1 and 2 will be alined with adjoining parallel potato rows or hills in the field, and the plows or shovels passing longitudinally through the rows will lift or uproot the potatoes in the two planted hills. The driver of the implement who occupies the seat 3 mounted on the tractor, steers or guides the tractor to maintain the plows in alinement with the rows and the traction belts T' in alinement with the furrows of the field.

These two plows 1 and 2 deliver the uprooted crop to two endless, slatted, carriers or elevators 4 and 5, which as indicated in Figure 2 diverge rearwardly, and at the rear ends of these carriers their loads are delivered to two parallel, endless, slatted conveyors 6 and 7, that are mounted or supported in horizontal positions, and parallel, one at each side of the tractor.

Inasmuch as the construction and arrangement of the left hand unit and the right hand unit are complementary, the description of the construction of one unit will suffice for both units of the multi-plow implement.

The plows are rigidly mounted at the front lower ends of the troughs 8, 8 of the carriers 4 and 5. These upwardly inclined and outwardly diverging troughs are each slidably and pivotally supported by means of its slotted opening 8' at their rear upper ends on transversely extending horizontal shafts 9, 9, journaled in bearings at the upper ends of laterally spaced standards 10, 10 which, at their lower ends are rigidly mounted on the tractor, and braced by diagonals 10a.

These shafts 9 are provided with supporting rollers for the endless carriers and sprocket wheels 11 to drive the endless carriers, the lower, idle flights of the carriers being supported on guide rollers 12 beneath the troughs, and an idle roller 13 is journaled at the front end of each trough to support the front or lower end of the carrier. A power-take-off is indicated at 14 in Figure 1, and the chain-drives for the two endless carriers receive power from two sprocket chains 15 to the driven sprockets 16, 16, for rotating the shafts 9, 9, to operate the carriers.

For lifting, or vertically adjusting, the two shovels and their carriers, and causing the troughs 8, 8, to swing on their rear, upper pivots 9, 9, a single, centrally located, power-operated motor or hydraulic jack 17 is mounted on the front end of the main frame F, and fluid under pressure is supplied from a pump or other suitable source, through the supply pipe 18, under control of the lever 19 shown in Figure 1 where it is readily accessible to the driver occupying the seat 3.

The motor 17 includes a piston 20 (dotted lines Fig. 5) and an upwardly extending stem 21, which projects through the top of the motor cylinder or jack-cylinder, has pivoted at opposite sides of its free end two links 22 and 23. These links extend downwardly at the opposite sides of the motor or jack and at their lower ends they are pivoted to two crank arms 24, 24 which are rigidly mounted on a rock shaft 25 and provided with a series of pivot holes 26 for adjustment in the variation of the throw of the crank arms, as desired.

Figure 4:
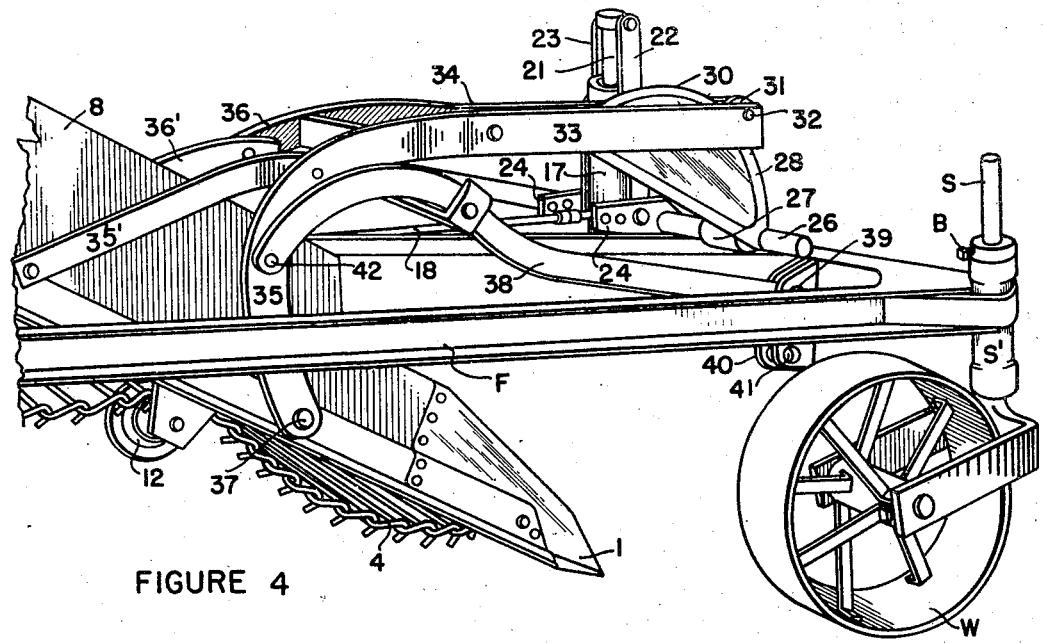
Figure 4 is an enlarged detail view in perspective at the front of the plow-frame, which is located in front of the tractor, and showing one of the plows together with the single power-operated means, or motor, for simultaneously lifting both plows.
Figure 5:
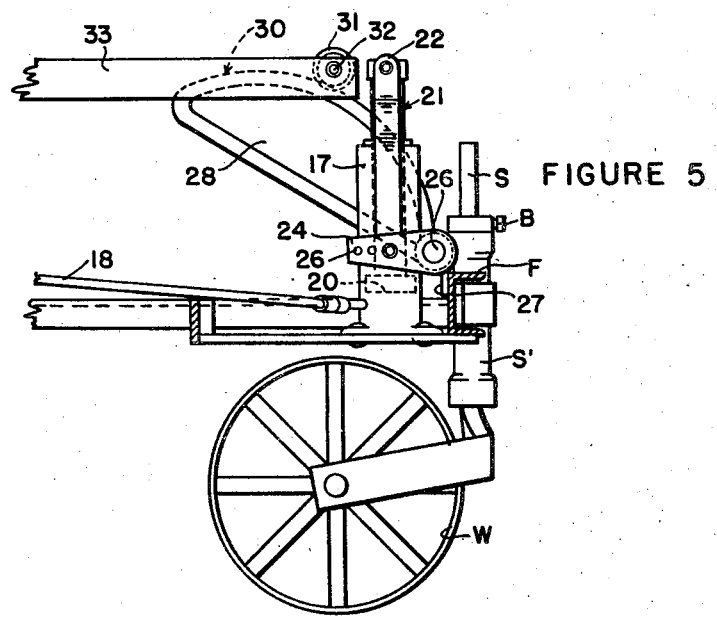
Figure 5 is a vertical sectional view at the front of the plow-frame, showing the plow-lifting motor and the lifting mechanism of one of the plows.

The rock shaft 25 is journaled transversely of the implement in bearings 27 of the main frame F, and upon the opposite ends of the rock shaft are rigidly fixed two rocker arms 28 and 29, each one being employed to lift a plow and swing its carrier-trough on the pivot shafts 9, 9. As best seen in Figures 4 and 5 the rocker arms, which project above the rock shaft 25 are each fashioned with an arcuate or segmental bearing edge or cam edge 30. These cam edges are constantly in frictional contact with and ride under bearing rollers 31 that are journaled at 32 in the front ends of the two beams for the plow 1 and 2. Each of these plow beams includes a pair of rigidly united, but spaced side bars 33 and 34, which at their parallel front portions form a slot in the front end of which a roller 31 is journaled, and in which slot a rocker arm 28 or 29 may swing while bearing against a roller. These two bars 33 and 34 of a plow beam diverge rearwardly, and their downwardly curved ends 35 and 36 are bolted at 37 to the troughs, near the shovels or plows, and diagonal braces 35' and 36' unite the troughs rigidly with the beams.

Thus it will be apparent that the elevators or carriers with their plows, may be lifted from operative position through power transmitted from the single hydraulic motor or jack, the rocker arms and rollers, from the lowered position of Figure 4 to a higher position in Figure 5, and to the uplifting position of Figure 1.

The plow units 1 and 2 are maintained in any adjusted position, either raised as in Figure 1 or lowered as shown in Figure 4, by the closing of the valve controlling the flow of hydraulic fluid to or from the cylinder. As long as the fluid cannot flow to the cylinder, the plows will not be raised, and by their own weight cannot be raised an appreciable degree due to changes in the terrain. The plows may only be lowered by permitting the fluid to escape from the cylinder back to its reservoir, and they will be dragged further underground by the draft mechanism.

The plow units of course may be lowered by manipulation of the lever 19 for controlling the decrease of pressure in the hydraulic jack, thereby permitting downward movement of the piston, its stem, and the linked connections thereto.

To assist in taking up the strain imposed by the resistance encountered by the plows as they pass through the hills or rows, I employ two pairs of draw-bars 38—38 coupled between the front cross bar of the main frame F and each of the plow beams, the front end of each draw bar being coupled at 39 in a bracket 40 having a series of holes 41 for adjusting the coupling, and the rear end of each draw bar is pivoted at 42 to a plowbeam. Thus as the tractor propels the implement, including the front frame F the plows are not only advanced by the pushing action of the tractor, but they also are advanced by the pull from the frame F through the draw bars to the plows.

With the plows lowered to position for shoveling or scooping the potatoes from their hills, the potatoes, vines and debris are passed from the plows to the inclined carriers, and under agitation from the slatted carriers some of the debris is separated and dropped from the carriers, the remaining crop being dumped, continuously, from the carriers to the horizontal, endless conveyers 6 and 7 for preliminary grading.

Figure 3:
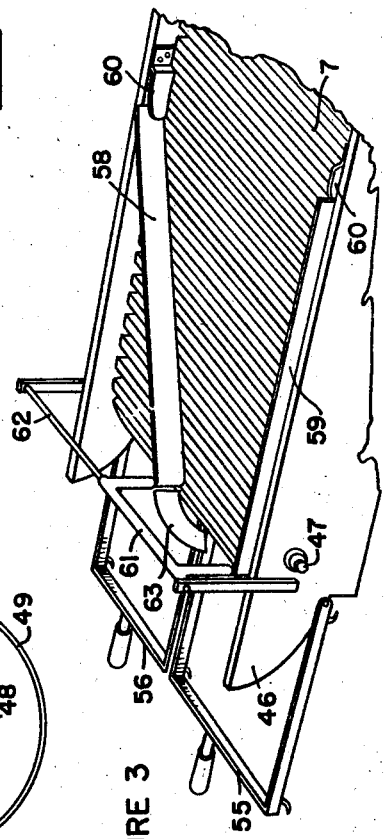
Figure 3 is an enlarged perspective view at the rear of one of the units, showing the duplex bag (or sack) holders and the laterally adjustable means for feeding the potatoes to alternate sacks or bags.

Each of the conveyers is driven from a shaft 9 through a chain drive enclosed in the casing 43, which drive includes a sprocket 44 on the outer end of each of the shafts 9 and extends to complementary sprockets and a roller on a countershaft 45, and the rear end of each endless conveyer passes over driven sprocket wheels and a roller journaled in the usual trough 46, as indicated at 47 in Figures 1 and 3.

On each side of the implement an exterior platform 48 is provided and supported from the main frame F, and a semi-circular guard-rail 49 is used with each platform for the attendant who stands on the platform and hand-picks rocks, debris, and other undesired articles from the potato crop as it is conveyed to the rear of the implement.

For the disposal of dust, light vines and light debris, that are separated from the potato crop while in transit, I employ a collecting hood 50, one located directly over each of the endless conveyers 6 and 7, and suction pipes 51, 51 extend from these hoods to a central suction fan 52 supported at the rear of the tractor, whereby the collected debris is dropped back of the implement into a furrow of the field as the implement progresses.

In order to place the potato crop in sacks or bags immediately, as the potatoes are discharged from the conveyers, I provide a platform 53, supported from the rear of the tractor and also supported on wheels 54, 54. As indicated in Figure 2 this platform extends the full width of the implement for the convenience of attendants, who bag, or sack the potatoes from both units of the implement as the crop is discharged from the endless conveyers.

Each unit has a dual or duplex arrangement of bag-holders as 55 and 56 mounted on a trough 46, upon which the bags 57 are suspended, and means are provided for feeding the potatoes from the conveyer, alternately, to the two bags, or sacks, in order that one sack or bag may be receiving the potatoes while the other, filled, sack may be tied up and removed from its holder to be replaced by another empty sack or bag.

For this purpose two flat blades or deflectors 58 and 59 each having its front end loosely pivoted within anchoring plates 60, are employed, and these plates are attached on the inner sides of the trough 46 above the slatted conveyer as 7. The rear ends of the blades are pivotally suspended from the ends of the arms of an inverted U-shaped frame 61, which is slidable on a horizontal frame bar 62 extending transversely across and above the trough 46. The deflecting blades are moved simultaneously, by sliding the frame 61 on the cross bar 62, and as the length of the slide frame 61 is approximately one half the width of the conveyer trough, the sliding movement of the frame moves one blade as 58 into diagonal position and alined with the fixed guide 63 located between the two sacks. The other blade 59, by the same slide movement, is moved against and parallel with a side wall of the trough. The diagonally disposed blade thus directs the potatoes from the full width of the conveyer to the exit or discharge portion of the conveyer which is half the full width of the conveyer, and the potatoes are all deflected into a single sack. After one sack is filled the frame 61 is slid toward the other side of the trough, and then the second sack is filled, and so on.

Having thus fully described my invention, what I claim as new and desire to secure by Letters Patent is:

1. In a potato digger of the tractor-propelled type the combination with a front wheeled-frame having a rear support on the tractor, of an upwardly inclined trough and endless carrier and a plow mounted at the lower front end of the trough, a horizontally disposed endless conveyer located at the rear of the carrier to receive potatoes therefrom, means for operating said carrier and said conveyer, said carrier-trough having a rear pivotal support, and means for swinging the trough and carrier on said support for vertically adjusting the plow.

2. In a potato digger of the tractor propelled type, the combination with a tractor adapted to travel through parallel adjoining furrows, and a front main frame pivotally supported at its rear end on said tractor, said main frame also having at its front end supporting caster-wheels, of a pair of plows spaced to pass through adjoining hills, each of said plows having an upwardly inclined trough and an endless carrier mounted in each trough, a single power-operated motor mounted on the main frame, and mechanical connections from said motor to said plows for lifting the latter.

3. In a potato digger of the tractor-propelled type, the combination with a tractor, a U-shaped frame pivotally connected with the tractor and front caster-wheels for the frame, and a power operated motor mounted at the front of the frame, of a pair of laterally spaced plows each having a rigid upwardly inclined trough and a rear pivotal support for each trough, a beam for each plow, and mechanical connections between said motor and said beams for simultaneously lifting both plows from operative position.

4. In a potato digger of the tractor-propelled type, the combination with a U-shaped front frame having rear pivotal connections on the tractor, front caster-wheels, and a platform mounted at the rear of the tractor, of a pair of spaced troughs having their rear ends pivotally supported on the front frame adjacent its connection to said tractor, a plow rigidly mounted at the lower front end of each trough and an endless carrier moving in each trough, an endless conveyer mounted independently of the tractor at the rear of each carrier and said conveyers terminating over the rear platform, means for vertically adjusting said plows, and means for operating said endless carriers and conveyers.

5. In a potato digger of the tractor-propelled type, the combination with a front main frame having pivotal supports on the tractor, front caster-wheels, and super-structure adjacent its rear ends, of an upwardly inclined trough having its rear end pivotally supported in said super-structure, a plow rigid with the front lower end of the trough, an endless carrier traveling in the trough and operating means therefor, and means for swinging the trough on its pivotal support to vertically adjust the plow.

6. In a potator digger of the tractor-propelled type, the combination with a front frame having rear pivotal supports and front whels, and a motor mounted on said frame, of an upwardly inclined trough slidably pivoted above said frame, a plow rigid with the front lower end of the trough, an endless carrier traveling in the trough and operating means therefor, a beam mounted on the plow, mechanical connections between said beam and motor for swinging the trough to vertically adjust the plow, and a drawbar connected to said beam and said front frame to assist in the advancement of the plow through the ground.

7. The combination in a potato digger of the tractor-propelled type and including a front plow-frame, with a carrier-trough having a rear sliding pivotal support, and a plow rigidly mounted at the front end of the trough, of a plow-beam rigid with the trough and projecting forward adjustable supporting means mounted on the frame for lifting the plow, and a draw bar pivotally connected to said beam and said plow frame.

8. The combination in a potato digger including a tractor, and a front, wheeled-frame having a rear pivotal support on the tractor, of a carrier-trough having its rear upper end slidably pivoted mounted on the wheeled frame and a plow attached at the front lower end of the trough, a plow beam rigid with the trough and projecting forwardly of the frame, a draw-bar pivotally connecting the front of the frame and the beam, and power-operated means mounted on the frame for co-action with the beam for lifting the plow.

9. In a multi-plow potato digger, the combination with a frame, a pair of laterally spaced carrier-troughs pivotally supported at their rear ends, and a plow rigid with the front end of each trough, of a plow beam rigid with each trough and having a forwardly projecting front end, a rock shaft mounted on the frame and a pair of rocker-arms mounted on the shaft for co-action with the front ends of the beams, and power-operated means for rocking said shaft to lift the plows.

10. In a potato digger, the combination with a frame, a motor mounted thereon and a pair of lifting links mounted on and actuated by the motor, of a pair of laterally spaced carrier-troughs having pivotally supported rear ends and a plow mounted at the front end of each trough, a plow beam rigid with each trough and having a slotted front end, an anti-friction roller journaled in each front end of the beams, a rockshaft having crank-arms pivotally connected to said links, and a pair of rocker arms mounted on the shaft, movable through said slotted ends and co-acting with said rollers to lift the plows.

11. In a potato digger of the tractor-propelled type, the combination with a front wheeled-frame adapted to be supported at its rear end on the tractor, of digger and elevator means slidably and pivotally supported upon said frame, of a plow beam attached to said digging and elevating means and extending forwardly, a pivoted draft bar connected between said frame and said plow beam, of conveyor means adjacent the discharge end of the elevator means, and means for operating said elevator and conveyor means.

12. In a potato digger of the tractor-propelled type, the combination with a U-shaped front wheeled frame adapted to be supported at its rear end on the tractor, of digger and elevator means slidably and pivotally supported upon said frame, of a plow beam attached to said digging and elevating means and having an independent forward draft bar connecting it with said frame, of conveyor means adjacent the discharge end of the elevator means, and means for operating said elevator and conveyor means.

13. In a potato digger of the tractor-propelled type, the combination with a front wheeled frame adapted to be pivotally supported at its rear end on the tractor, of digger and elevator means slidably and pivotally supported upon said frame, of a plow beam attached to said digging and elevating means, means operable on said beam to raise and lower the digger and elevating means, a forward draft bar connected to said beam and said frame, of conveyor means adjacent the discharge end of the elevator means, and means for operating said elevator and conveyor means.

14. In a potato digger, the combination with a tractor, a U-shaped frame pivotally connected with the tractor and front caster wheels for the frame, and a power operated motor mounted at the front of the main frame, of a plow having a rigid upwardly inclined trough and a rear pivotal support for said trough, of a plow beam attached at its rear end to the trough and having a front slotted portion, a rocker arm mounted on the frame for the support of and co-action with said slotted portion, and means for actuating said rocker arm to lift the plow.

15. In a potato digger, the combination with a tractor, a U-shaped frame pivotally connected with the tractor and front caster wheels for the frame, and a power operated motor mounted at the front of the main frame, of a plow having a rigid upwardly inclined trough and a rear pivotal support for said trough, of a plow beam rigid with the trough and plow, a draw bar pivotally connecting said beam and frame, said beam having a front slotted portion and an anti-friction roller mounted therein, a rocker arm mounted on the frame and frictionally engaging said roller, and means for rocking the arm to lift the plow.

HARRY H. SCHOOLER.